United States Patent
Schulman

(10) Patent No.: US 9,935,990 B1
(45) Date of Patent: Apr. 3, 2018

(54) SYSTEMS AND METHODS FOR MULTICAST STREAMING ANALYSIS

(71) Applicant: Symantec Corporation, Mountain View, CA (US)

(72) Inventor: Martin Schulman, Herndon, VA (US)

(73) Assignee: Symantec Corporation, Mountain View, CA (US)

( * ) Notice: Subject to any disclaimer, the term of this patent is extended or adjusted under 35 U.S.C. 154(b) by 303 days.

(21) Appl. No.: 14/145,670

(22) Filed: Dec. 31, 2013

(51) Int. Cl.
*H04L 29/06* (2006.01)
*H04L 29/12* (2006.01)

(52) U.S. Cl.
CPC .......... *H04L 65/60* (2013.01); *H04L 61/2575* (2013.01)

(58) Field of Classification Search
CPC ............................... G06F 15/309; H04L 65/60
USPC ......................................................... 709/219
See application file for complete search history.

(56) References Cited

U.S. PATENT DOCUMENTS

| | | | | |
|---|---|---|---|---|
| 2007/0189193 A1* | 8/2007 | Previdi | ............... | H04L 12/1868 370/256 |
| 2008/0034030 A1* | 2/2008 | Toohey | .................. | G06Q 10/00 709/203 |
| 2009/0262741 A1* | 10/2009 | Jungck | .............. | H04L 29/12066 370/392 |
| 2013/0198815 A1* | 8/2013 | Piliouras | ................. | H04L 63/10 726/4 |
| 2013/0318022 A1* | 11/2013 | Yadav | .................... | G06Q 10/00 706/46 |

* cited by examiner

*Primary Examiner* — Normin Abedin
*Assistant Examiner* — Sibte Bukhari
(74) *Attorney, Agent, or Firm* — Holland & Hart LLP

(57) ABSTRACT

A computer-implemented method for anonymously selecting streams for analysis is described. In one embodiment, control information that associates one or more telemetry feeds with one or more multicast sources is identified. One or more multicast sources are joined based on the received control information and data from the multicast source is analyzed based on one or more data analysis parameters.

17 Claims, 7 Drawing Sheets

SYSTEMS AND METHODS FOR MULTICAST STREAMING ANALYSIS

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often require human and computer interaction. Users of computer technologies continue to demand an increase in the efficiency of these technologies. Improving the efficiency of computer technologies is always desirable to anyone who uses and relies on computers.

The wide-spread use of computing devices and the computer networks to which they connect has seen an increase in data collection. In some cases, however, transferring this collected data to customers that want to analyze the data may be cost-prohibitive.

SUMMARY

According to at least one embodiment, a computer-implemented method for streaming analysis is described. In one embodiment, control information that associates one or more telemetry feeds with one or more multicast sources may be provided. One or more multicast sources may be joined based on the provided control information. Data from the one or more multicast sources may be analyzed based on one or more data analysis parameters.

In some embodiments, performing multicast streaming analysis may include comparing data from the multicast feed to a keyword. Additionally or alternatively, analysis may include detecting a pattern of data within packets, or across multiple packets from one or more multicast sources. Upon detecting a match between the data from the multicast source and the one or more keyword, a notification may be generated. Upon detecting a pattern within a packet or across multiple packets, a notification may be generated. Additionally, or alternatively, upon detecting a match between the data from the multicast source and the one or more keywords, data associated with the detected match may be stored in a storage device. Upon detecting a pattern within a packet or across multiple packets, data associated with the detected match may be stored in a storage device.

In one embodiment, one or more multicast sources (e.g., telemetry feeds) may be categorized according to one or more characteristics. The one or more characteristics may include a geographic location, a private sector association, a public sector association, an industry association, a corporate association, a personal use association, and the like. A multicast subscription library may be provided that enables selection of multicast sources based on the characteristics of the contained telemetry.

In some cases, internet group management protocol (IGMP) snooping may be implemented in association with the multicast streaming analysis. The method and systems described herein may use IGMP snooping to manage the processing of requests to subscribe to a multicast group and to limit information flow from the analysis functions to the multicast source.

In some embodiments, the use of multicast user datagram protocol (UDP) packets may be allowed in association with the multicast streaming analysis. The use of one or more of any other type of packet other than UDP packets (e.g., unicast packets, broadcast packets, etc.) may be disabled in association with the multicast streaming analysis. In some cases, intra-subnet and/or inter-subnet communications may be blocked among and/or between analysis functions. Additionally, or alternatively, a network access log may be disabled in relation to the multicast streaming analysis. In some embodiments, external access to the analysis function may be provided.

A computing device configured for streaming analysis is also described. The device may include a processor and memory in electronic communication with the processor. The memory may store instructions that are executable by the processor to receive and process control information that associates one or more telemetry feeds with their corresponding one or more multicast sources, join one or more multicast sources based on the identified control information, and analyze data in the anonymous multicast feed based on one or more data analysis parameters.

A computer-program product for streaming analysis is also described. The computer-program product may include a non-transitory computer-readable medium that stores instructions. The instructions may be executable by a processor to identify control information that associates one or more telemetry feeds with their associated one or more multicast sources, join the one or more multicast sources based on the identified control information, and analyze data received from the one or more multicast sources based on one or more data analysis parameters.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
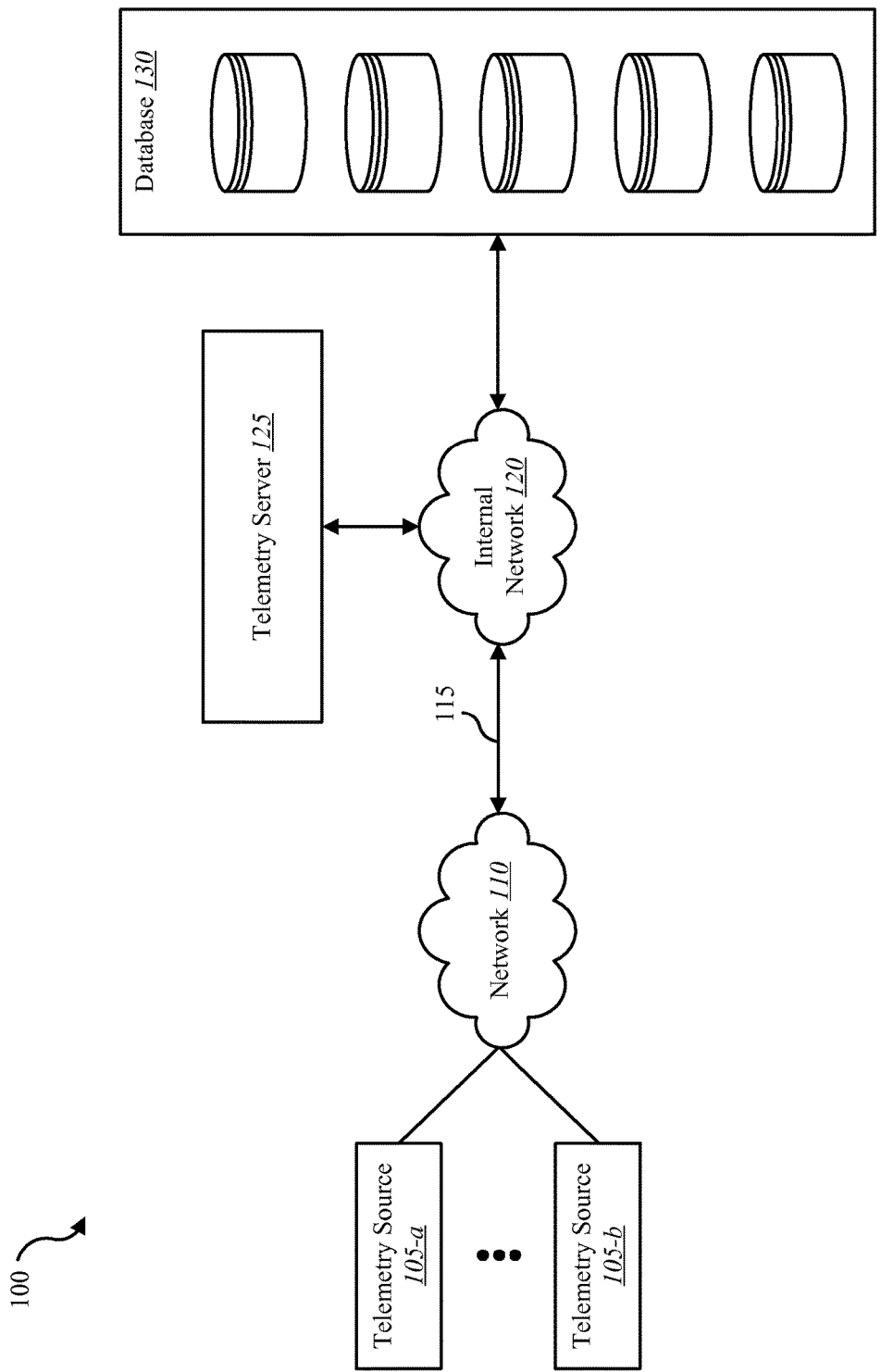
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to streaming analysis. More specifically, the systems and methods described herein relate to providing a multicast streaming analysis service to allow customers to perform real-time analysis on incoming telemetry feeds. Companies may collect gigabytes of telemetry data of interest that may be shared with researchers and/or partners. Transferring the repository of collected data from one data center to another may be undesirable for numerous reasons (e.g., cost prohibitive, time consuming, security risks, data trails, etc.), yet providing third party access to a company's database exposes analysis parameters to telemetry provider. A subset of queries could be performed using streaming analysis, where customers/researchers are granted access to data in transit and save only select portions of data of interest. Stream of data could be provided to a select number of customers using transfer control protocol (TCP)-based protocols. A TCP-based system, however, may not scale with additional customers, and a TCP-based system may require a customer system to send packets to the collecting company's systems, introducing security issues. Using multicast to distribute user datagram protocol (UDP)-based streams to multiple recipients provides significant scalability, because the load on the source servers is independent of the number of recipients. Furthermore, a multicast-based architecture may allow routing, access control lists, filters, and other techniques to ensure no end user could unintentionally or intentionally interfere with other users or normal internal operations. Moreover, the multicast-based architecture reveals no information about which telemetry feeds are of interest to a telemetry provider. The present systems and methods enables a server to provide data in multicast streams without divulging information regarding the nature of customer queries, analysis, parameters, etc. Additionally, due to the multicast nature of the multicast streaming service, the load on servers is independent of the number of streaming analysis customers. Thus, the systems and methods described herein may allow a customer to query a server providing data in multicast streams in real-time without exposing information related to the customer's search and analysis parameters, and independent of server load.

FIG. 1 is a block diagram illustrating one embodiment of an environment 100 in which the present systems and methods may be implemented. Environment 100 may include one or more telemetry sources 105, a network 110, an internal network 120, a telemetry server 125, and a database 130. In some embodiments, a telemetry source 105 may communicate with telemetry server 125, and/or database 130 via network 110 and/or internal network 120. Examples of telemetry sources 105 include mobile devices, smart phones, personal computing devices, computers, servers, etc.

Examples of network 110 and/or internal network 120 include local area networks (LAN), wide area networks (WAN), virtual private networks (VPN), wireless networks (using 802.11, for example), cellular networks (using 3G and/or LTE, for example), etc. In some configurations, the networks 110 and/or 120 may include the internet. The connection 115 to internal network 120 may specify user credentials, network access control, domains, type of user account (e.g., administrator, general user, roaming, etc.), access and/or denial to applications and programs, software updates, synchronization schedules and time-outs, computer security settings, membership in certain groups in the network, bandwidth limits, access and restrictions to sites on the network, access and restrictions to internet and internet sites, and the like.

In some embodiments, telemetry server 125 may be coupled to database 130 via internal network 120. Database 130 may include a network of databases managed by multiple database servers that appears to a user as a single logical database. The data of all databases in the database may be simultaneously accessed and/or modified. Database 130 may be internal or external to telemetry server 125. In some embodiments, database 130 may be internal or externally connected to a telemetry source 105. As depicted, a telemetry source 105 may connect to the telemetry server 125 through network 110, where network 110 is a network that is external to the internal network 120. In some embodiments, environment 100 may include a single network, where network 110 and internal network 120 are part of the same network. Telemetry source 105 may send telemetry data to telemetry server 125. Telemetry data may include measurements and/or other data collected at a device located at a remote location and transmitted to receiving equipment for monitoring (e.g., data collected from one or more employee computing devices regarding computer usage, data related to suspected malware detected at a telemetry source, and the like). Data received by telemetry server 125 may be processed by telemetry server 125 and stored in database 130, allowing a telemetry source 105 to access the stored data in the database 130 for analysis.

Figure 2:
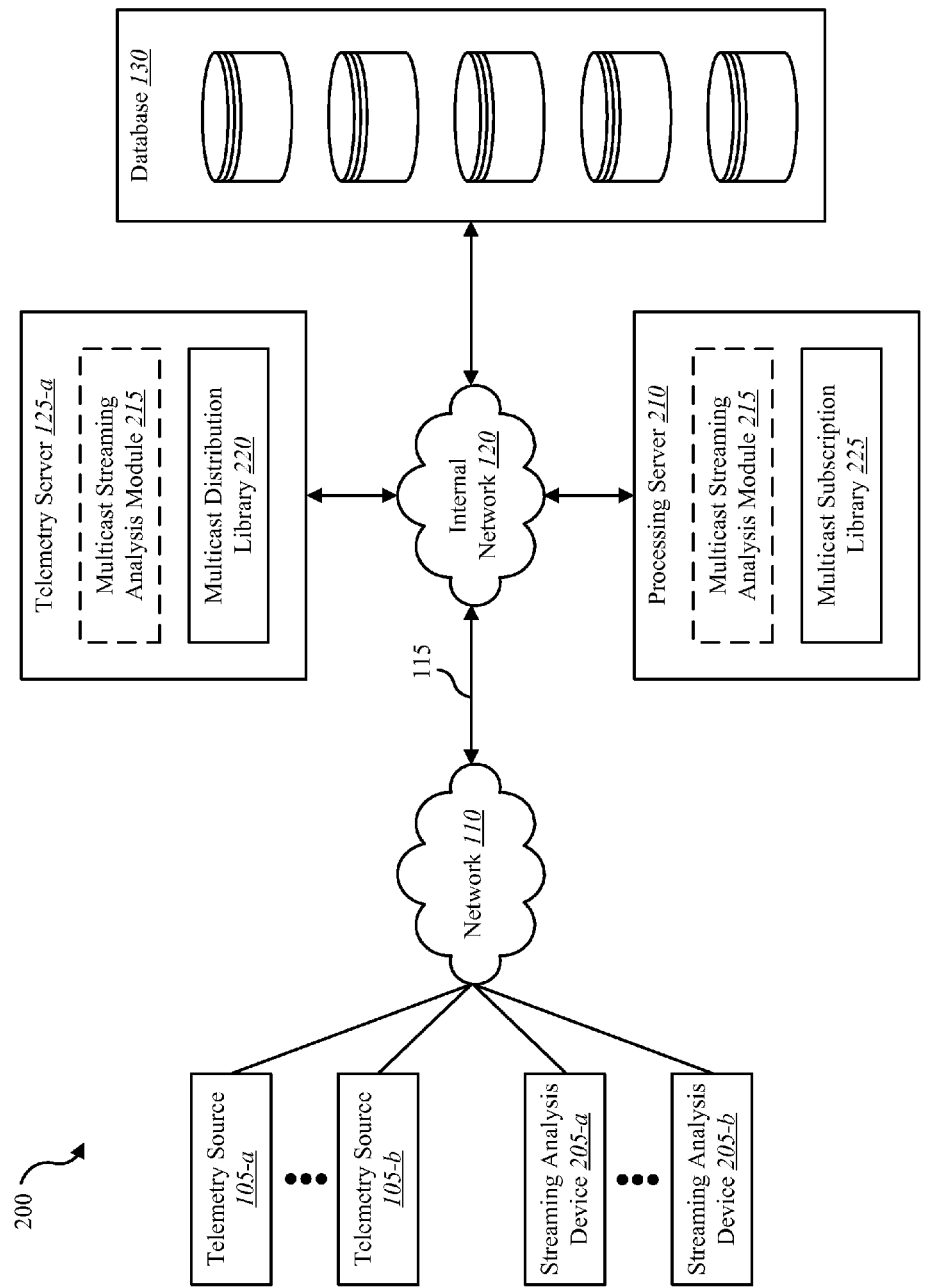
FIG. 2 is a block diagram illustrating one embodiment of an environment in which the present systems and methods may be implemented.

FIG. 2 is a block diagram illustrating one embodiment of an environment 100 in which the present systems and methods may be implemented. Environment 100 may include one or more telemetry sources 105, one or more streaming analysis devices 205, network 110, internal network 120, telemetry server 125-a, processing server 210, and database 130. In some configurations, telemetry server 125-a may include a multicast streaming analysis module 215 and/or a multicast distribution library 220. In some embodiments, telemetry feeds available for streaming analysis may have their processing applications linked to a common library that packages individual records for multicast transmission (e.g., multicast distribution library 220).

In some cases, processing server 210 may include a multicast streaming analysis module 215 and/or a multicast subscription library 225. Examples of servers 125-a and/or 210 may include one or more proxy servers, mail servers, web servers, server platforms, application servers, real-time communication servers, collaboration servers, file transfer protocol (FTP) servers, list servers, telnet servers, virtual servers, and the like. Networks 110 and/or 120 may include one or more virtual private network (VPN) systems, additional networks, gateways, firewalls, nodes, and other network devices. As described above, access to the multicast subscription library 225 via connection 115 may be protected by one or more security features such as requiring a user to enter user credentials, using encryption, granting access based on asymmetric cryptography, secure socket layer (SSL), using a firewall, implementing a virtual private network, tunneling, and the like.

In some embodiments, the systems and methods described herein may be performed on a single device (e.g., telemetry source 105, telemetry server 125, processing server 210, or database 130). For example, multicast streaming analysis module 215 may be located solely on telemetry server 125-a or processing server 210. In some embodiments, a telemetry source 105 and/or a streaming analysis device 205 may include a multicast streaming analysis module 215. In some cases, telemetry source 105 and/or streaming analysis device 205 may include an application that allows telemetry source 105 and/or streaming analysis device 205 to interface with multicast streaming analysis module 215 located on telemetry server 125 and/or processing server 210. In some embodiments, telemetry source 105, telemetry server 125, processing server 210, and database 130 may include a multicast streaming analysis module 215 where at least a portion of the functions and operations of multicast streaming analysis module 215 are performed separately and/or concurrently on telemetry source 105, telemetry server 125, processing server 210, and/or database 130. In one case, a user of a telemetry source 105 and/or streaming analysis device 205 may initiate over networks 110/120 a process of multicast streaming analysis module 215 that executes on processing server 210. In some cases, a user of a telemetry source 105 and/or streaming analysis device 205 may initiate over networks 110/120 a process of multicast streaming analysis module 215 that executes on telemetry server 125-a.

Servers 125-a and 210 may include physical and/or virtual hardware on a streaming analysis network zone inside internal network 120. It is noted that network 110 may include one or more network devices that enable the one or more streaming analysis devices 205 to subscribe to one or more multicast stream subscription groups. The one or more network devices may include gateways, routers, and/or network switches that are configured to process the transmission of one or more multicast streams of data.

In one embodiment, multicast streaming analysis module 215 may analyze data received from a telemetry source 105, and package, in conjunction with the multicast distribution library 220, data associated with the data from the telemetry source 105 for multicast transmission. Multicast streaming analysis module 215 may transmit, in conjunction with multicast subscription library 225, one or more multicast feeds to processing server 210. Processing server 210 may process and/or analyze the data from the multicast feeds. In some cases, a streaming analysis device 205 may receive data related to one or more multicast feeds via a connection to internal network 120. A network device in network 110 (e.g., a network switch) may receive data associated with one or more multicast feeds from server 210, and may provide the data to one or more streaming analysis devices 205, thus offloading the data processing load of transmitting and retransmitting the multicast stream of data from servers 125-a and/or 210 to the one or more network devices in network 110. Accordingly, the load on servers 125-a and/or 210 may be independent of the number of multicast streaming analysis customers.

In one example, a customer (e.g., telemetry source 105) may detect suspected malware. The customer may want to know if other systems are detecting the same malware. The customer may generate a filter to detect the malware in relation to the telemetry data being received by the telemetry server 125-a. The customer may subscribe to one or more relevant multicast feeds via the multicast subscription library 225. The customer's streaming analysis host may save records where malware hash values, internet protocol (IP) addresses, and/or other fields of interest match. Data that triggers the filter may be pushed/pulled from internal network 120 to customer's streaming analysis host (e.g., streaming analysis device 205). In some embodiments, the customer's streaming analysis host operates in conjunction with multicast streaming analysis module 215. The customer's streaming analysis host may use the same device as the telemetry source 105. Additionally, or alternatively, the customer's streaming analysis host may include one or more different devices in addition to or instead of a device associated with telemetry source 105. As a result of the multicast architecture implemented in conjunction with multicast streaming analysis module 215, no information about the customer's query/analysis is conveyed to telemetry server 125-a and/or processing server 210, nor is there any impact on server load or security risk. Further details regarding multicast streaming analysis module 215 are discussed below.

Figure 3:
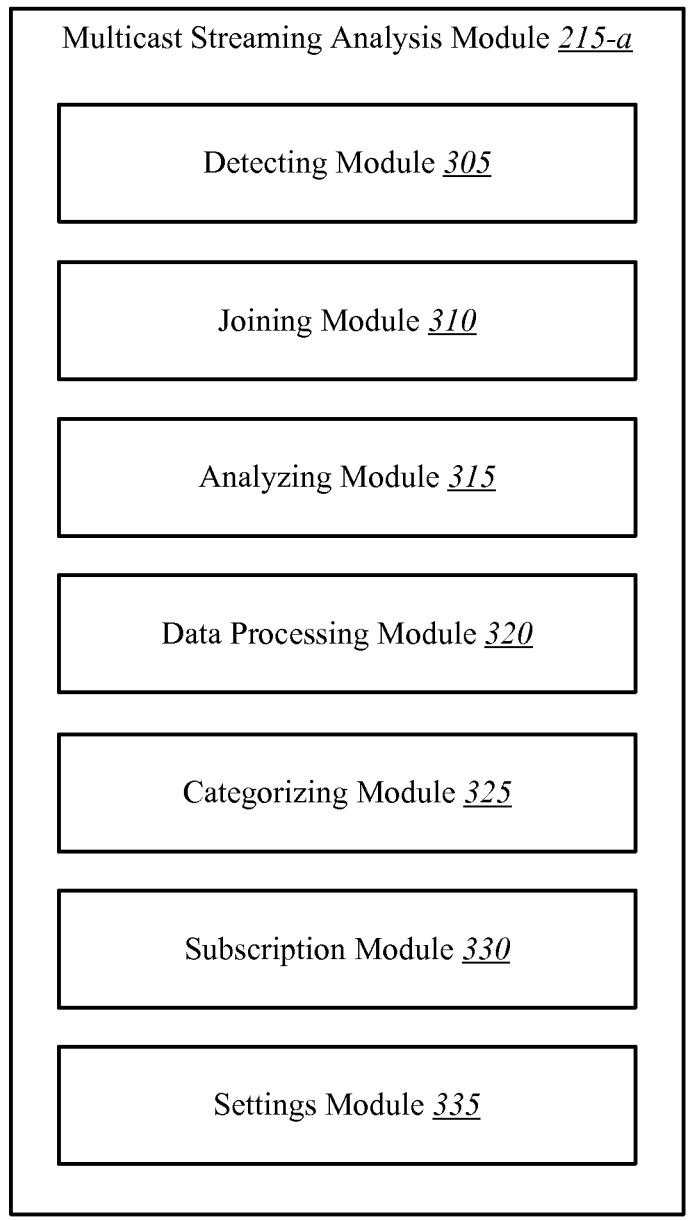
FIG. 3 is a block diagram illustrating one example of a multicast streaming analysis module.

FIG. 3 is a block diagram illustrating one example of multicast streaming analysis module 215-a. Multicast streaming analysis module 215-a may be one example of multicast streaming analysis module 215 depicted in FIG. 2. As depicted, multicast streaming analysis module 215-a may include a detecting module 305, a packaging module 310, a provisioning module 315, a data processing module 320, a categorizing module 315, a subscription module 320, and a settings module 325.

As described above, multicast streaming analysis module 215-a may implement a multicast-based architecture to provide data in multicast streams without divulging information regarding customer queries and analysis, and independent of a load on telemetry server 125 and/or processing server 210. At least some of the operations and functions of multicast streaming analysis module 215-a may be performed by or in conjunction with modules 305-335.

In one embodiment, detecting module 305 may identify control information associated with a subscription to an anonymous multicast feed. The anonymous multicast feed may include data from at least one telemetry feed that is packaged for multicast transmission. In some cases, the data from at least one telemetry feed may be packaged by a server (e.g., telemetry server 125). In some embodiments, joining module 310 may join the anonymous multicast feed based on the identified control information. In some configurations, the control information may include one or more data analysis parameters. In some cases, one or more data analysis parameters may be associated with and/or added to the control information. Examples of data analysis parameters may include data information (e.g., internet protocol (IP) address, hash value, file name, file type, file index information, etc.), timing information (e.g., date of incidence, time of incidence, time period, etc.), geographic information (e.g., city, state, country of origin, etc.), industry information (e.g., government, private enterprise, company association, etc.), and the like. In some embodiments, analyzing module 315 may analyze data in the anonymous multicast feed based on one or more data analysis parameters. In some cases, analyzing data in the anonymous multicast feed may include comparing data from the anonymous multicast feed to a value such as a keyword. Upon detecting a match between the data from the anonymous multicast feed and the keyword, data processing module 320 may generate a notification. A notification may include an email message, a text message, a pop-up message, etc. In some cases, upon detecting a match between the data from the anonymous multicast feed and the keyword, data processing module 320 may store data associated with the detected match in an electronic storage device.

In one embodiment, categorizing module 325 may categorize the multicast feed according to one or more characteristics associated with a telemetry feed. For example, categorizing module 325 may associate characteristics of a telemetry feed that may include geographic location information (e.g., from where the telemetry feed originates), private sector information associated with the telemetry feed (e.g., a private company associated with the telemetry feed), a public sector association (e.g., a government agency associated with the telemetry feed), an industry association (e.g., telemetry feeds originating from the energy industry), a personal use association (e.g., telemetry feed from a private user), and the like. In some embodiments, subscription module 330 may provide a multicast subscription library based on the categorization of a plurality of multicast feeds. Accordingly, a system may subscribe to particular multicast feeds based on the characteristics associated with the source telemetry feeds.

In some embodiments, settings module 335 may implement internet group management protocol (IGMP) snooping. IGMP snooping may be implemented to manage processing of requests to subscribe to one or more multicast feeds provided in the multicast subscription library. In some cases, settings module 335 may allow multicast user datagram protocol (UDP) packets to be used in association with the anonymous multicast feed. Additionally, or alternatively, settings module 335 may disable and/or block any type of packet other than UDP packets in association with the anonymous multicast feed (e.g., unicast packets, broadcast packets, etc.). Lack of unicast forwarding may prevent data theft, malware attacks, and/or accidental information leakage. Accordingly, packet flow may flow in one direction only, allowing subscribers to analyze the data without a data trail. In some cases, settings module 335 may block intra-subnet communications in relation to the anonymous multicast feed, preventing one subscriber from gathering information about another subscriber. In some embodiments, the settings module 335 may disable a network access log in relation to the anonymous multicast feed, thus removing a data trail that may be generated in networking equipment such as a network switch, router, etc., when a subscriber accesses the multicast subscription library. In some cases, settings module 335 may provide access to the multicast subscription library via a demilitarized zone (DMZ) network. In some embodiments, access to the multicast subscription library may be granted based on a user providing user credentials. Access and data transfers may be protected via encryption such as asymmetric cryptography.

Figure 4:
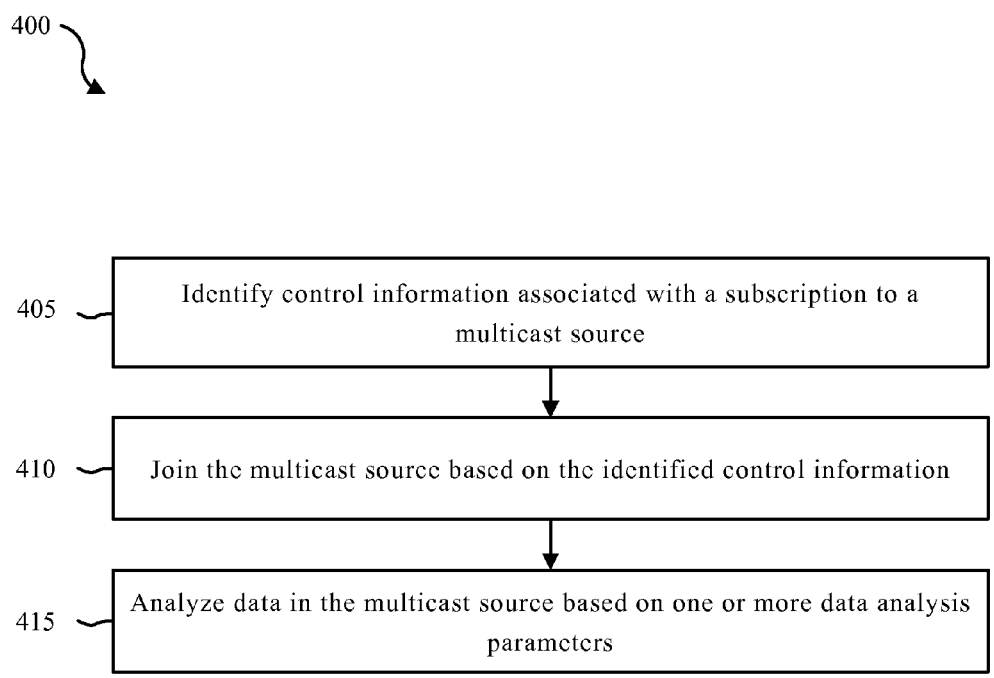
FIG. 4 is a flow diagram illustrating one embodiment of a method for multicast streaming analysis.

FIG. 4 is a flow diagram illustrating one embodiment of a method 400 for multicast streaming analysis. In some configurations, the method 400 may be implemented by multicast streaming analysis module 215 illustrated in FIGS. 1 and/or 2.

At block 405, control information that is associated with a subscription to a multicast source may be identified. The multicast source may include data from at least one telemetry feed that is packaged for multicast transmission. At block 410, the anonymous multicast source may be joined based on the identified control information. At block 415, data in the anonymous multicast feed may be analyzed based on one or more data analysis parameters.

Figure 5:
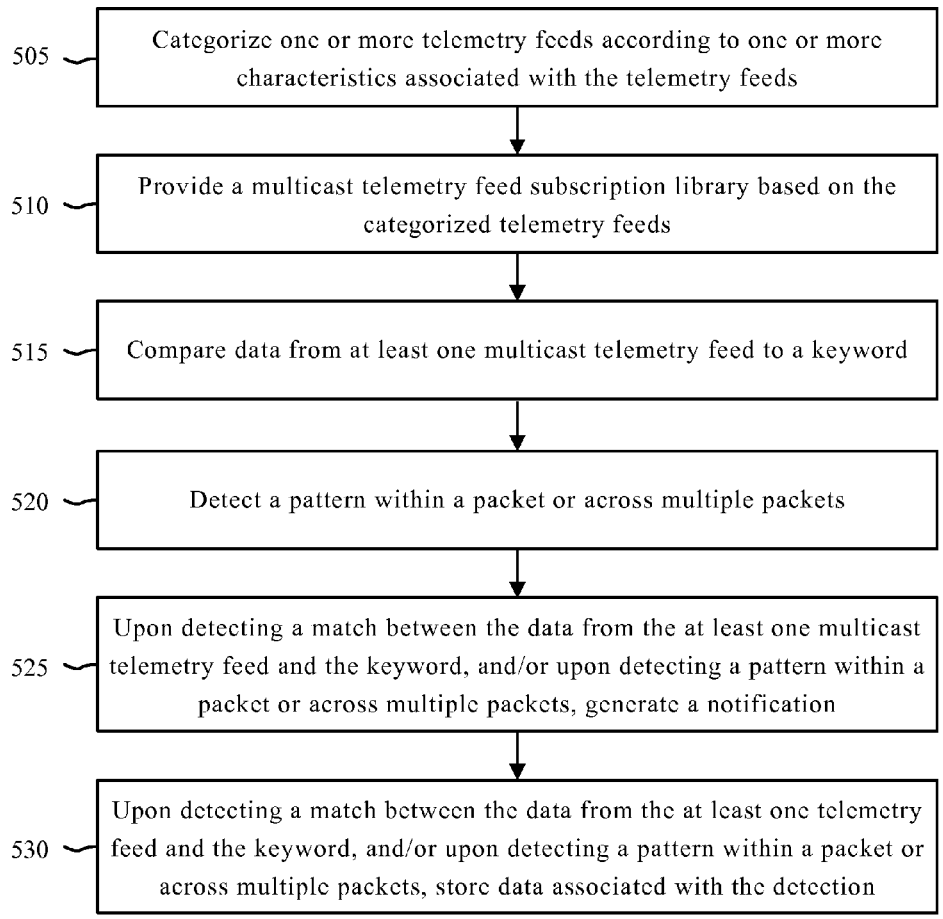
FIG. 5 is a flow diagram illustrating one embodiment of a method for providing a multicast streaming telemetry feed subscription service.

FIG. 5 is a flow diagram illustrating one embodiment of a method 500 for providing a multicast streaming telemetry feed subscription service. In some configurations, the method 500 may be implemented by multicast streaming analysis module 215 illustrated in FIGS. 1 and/or 2.

At block 505, one or more telemetry feeds may be categorized according to one or more characteristics associated with the telemetry feeds. At block 510, a multicast telemetry feed subscription library may be provided based on the categorized telemetry feeds. The one or more characteristics may include a geographic location, a private sector association, a public sector association, an industry association, a corporate association, a personal use association, and the like. The categorization of a telemetry feed may be associated with a categorization of a multicast feed. At block 515, data from at least one multicast telemetry feed from the multicast telemetry feed subscription library may be compared to a keyword. At block 520, a pattern within a packet or across multiple packets may be detected. At block 525, upon detecting a match between the data from the at least one multicast telemetry feed and the keyword, and/or upon detecting a pattern within a packet or across multiple packets, a notification may be generated. At block 530, upon detecting a match between the data from the at least one multicast telemetry feed and the keyword, and/or upon detecting a pattern within a packet or across multiple packets, data associated with the detected match and/or pattern may be stored.

In some embodiments, multicast streaming analysis settings may be implemented. Implementing the multicast streaming analysis settings may include one or more of the following: implementing internet group management protocol (IGMP) snooping in association with the multicast streaming analysis to manage processing of requests to subscribe to a multicast group provided in the multicast telemetry feed subscription library, allowing multicast user datagram protocol (UDP) packets in association with the multicast streaming analysis, disabling one or more of any other type of packet other than UDP packets in association with the multicast streaming analysis, blocking intra-subnet communications in relation to the multicast streaming analysis, disabling a network access log in relation to the multicast streaming analysis, and/or providing access to the multicast telemetry feed subscription library via a demilitarized zone (DMZ) network. In some cases, access to the multicast telemetry feed subscription library may be protected by one or more security features such as requesting user credentials, using a firewall, granting access based on asymmetric cryptography, and the like.

Figure 6:
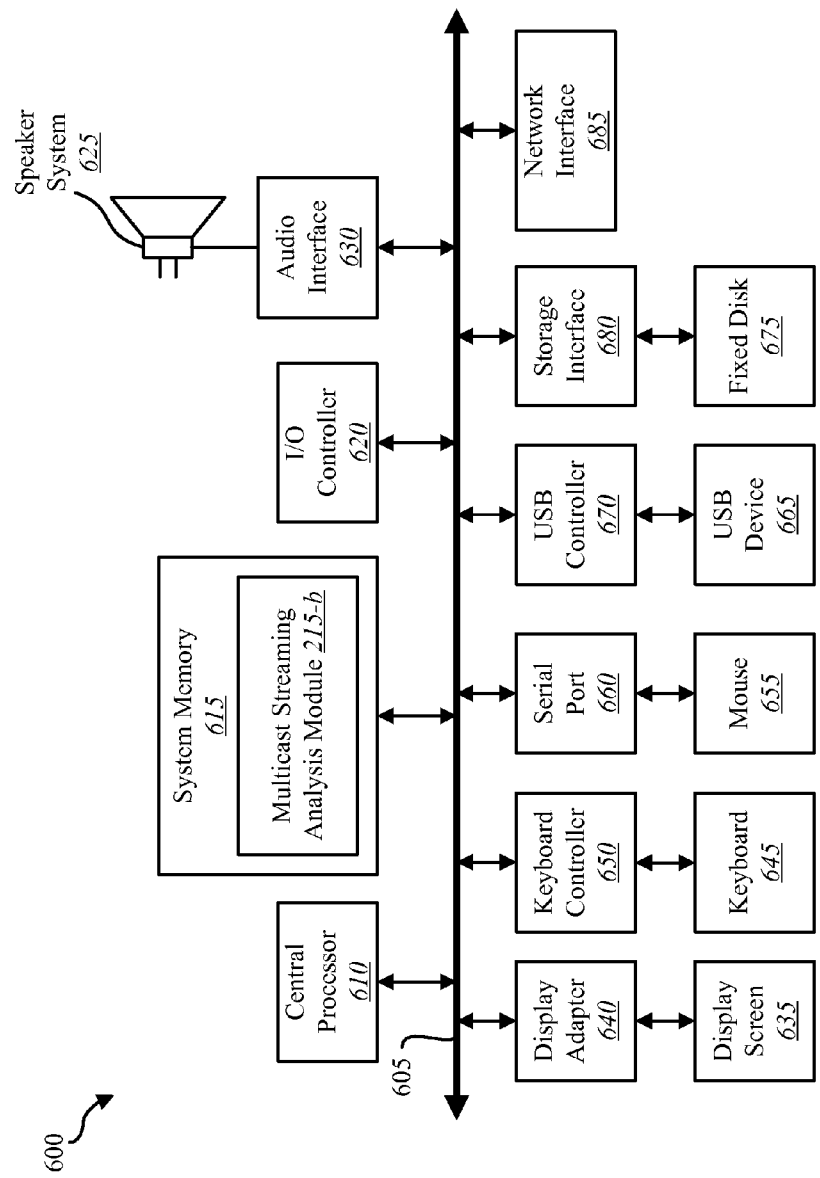
FIG. 6 depicts a block diagram of a computer system suitable for implementing the present systems and methods.

FIG. 6 depicts a block diagram of a computer system 600 suitable for implementing the present systems and methods. Computer system 600 may be one example of telemetry sources 105, 125, and/or 130 depicted in FIG. 1. Additionally, or alternatively, computer system 600 may be one example device 210 depicted in FIG. 2. Computer system 600 includes a bus 605 which interconnects major subsystems of computer system 600, such as a central processor 610, a system memory 615 (typically RAM, but which may also include ROM, flash RAM, or the like), an input/output controller 620, an external audio device, such as a speaker system 625 via an audio output interface 630, an external device, such as a display screen 635 via display adapter 640, a keyboard 645 (interfaced with a keyboard controller 650) (or other input device), multiple USB devices 665 (interfaced with a USB controller 670), and a storage interface 680. Also included are a mouse 655 (or other point-and-click device) connected to bus 605 through serial port 660 and a network interface 685 (coupled directly to bus 605).

Bus 605 allows data communication between central processor 610 and system memory 615, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, multicast streaming analysis module 215-b to implement the present systems and methods may be stored within the system memory 615. Multicast streaming analysis module 215-b may be one example of multicast streaming analysis module 215 depicted in FIGS. 2 and/or 3. Applications resident with computer system 600 are generally stored on and accessed via a non-transitory computer readable medium, such as a hard disk drive (e.g., fixed disk 675) or other storage medium. Additionally, applications can be in the form of electronic signals modulated in accordance with the application and data communication technology when accessed via interface 685.

Storage interface 680, as with the other storage interfaces of computer system 600, can connect to a standard computer readable medium for storage and/or retrieval of information, such as a fixed disk drive 675. Fixed disk drive 675 may be a part of computer system 600 or may be separate and accessed through other interface systems. Network interface 685 may provide a direct connection to a remote server via a direct network link to the Internet via a POP (point of presence). Network interface 685 may provide such connection using wireless techniques, including digital cellular telephone connection, Cellular Digital Packet Data (CDPD) connection, digital satellite data connection, or the like.

Many other devices or subsystems (not shown) may be connected in a similar manner (e.g., document scanners, digital cameras, and so on). Conversely, all of the devices shown in FIG. 6 need not be present to practice the present systems and methods. The devices and subsystems can be interconnected in different ways from that shown in FIG. 6. The operation of a computer system such as that shown in FIG. 6 is readily known in the art and is not discussed in detail in this application. Code to implement the present disclosure can be stored in a non-transitory computer-readable medium such as one or more of system memory 615 or fixed disk 675. The operating system provided on computer system 600 may be iOS®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 7:
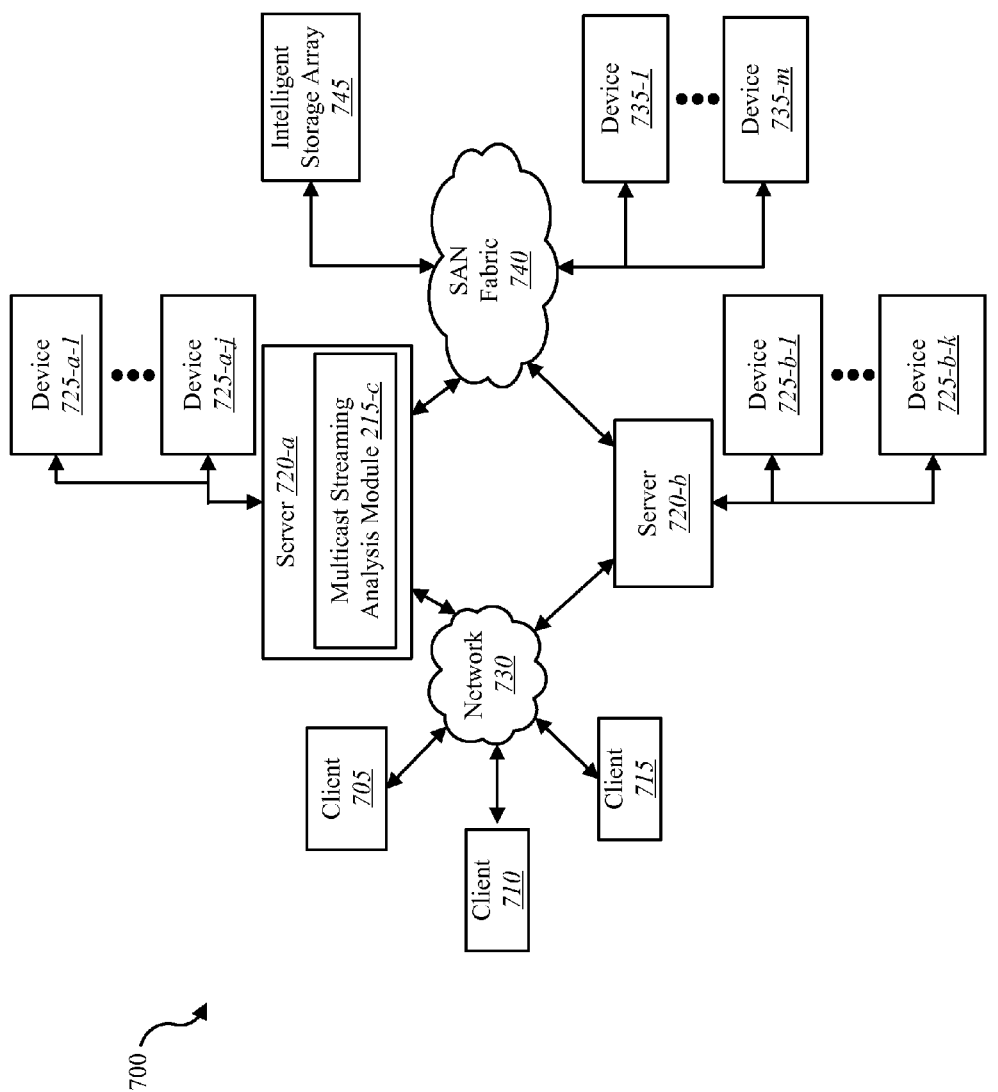
FIG. 7 is a block diagram depicting a network architecture in which client systems, as well as storage servers (any of which can be implemented using the computer system).

FIG. 7 is a block diagram depicting a network architecture 700 in which client systems 705, 710 and 715, as well as storage servers 720-a and 720-b (any of which can be implemented using computer system 600), are coupled to a network 730. In one embodiment, multicast streaming analysis module 215-c may be located within one of the storage servers 720-a, 720-b to implement the present systems and methods. Multicast streaming analysis module 215-c may be one example of multicast streaming analysis module 215 depicted in FIGS. 2, 3, and/or 6. The storage server 720-a is further depicted as having storage devices 725-a-1 through 725-a-j directly attached, and storage server 720-b is depicted with storage devices 725-b-1 through 725-b-k directly attached. SAN fabric 740 supports access to storage devices 735-1 through 735-m by storage servers 720-a and 720-b, and so by client systems 705, 710 and 715 via network 730. Intelligent storage array 745 is also shown as an example of a specific storage device accessible via SAN fabric 740.

With reference to computer system 600, network interface 685 or some other method can be used to provide connectivity from each of client computer systems 705, 710 and 715 to network 730. Client systems 705, 710 and 715 are able to access information on storage server 720-a or 720-b using, for example, a web browser or other client software (not shown). Such a client allows client systems 705, 710 and 715 to access data hosted by storage server 720-a or 720-b or one of storage devices 725-a-1-725-a-j, 725-b-1-725-b-k, 735-1-735-m or intelligent storage array 745. FIG. 7 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method for anonymously selecting data streams for analysis, the method comprising:
   identifying, by a processor of a client device, control information that associates a first set of data from one or more telemetry feeds, among a plurality of telemetry feeds, with a multicast source, the plurality of telemetry feeds comprising a plurality of remote computing devices providing multiple sets of data, including the first set of data, to a central server, the central server associating the first set of data with the multicast source based at least in part on a characteristic of the first set of data, the multicast source comprising a multicast transmission of the first set of data from the central server;
   categorizing one or more multicast sources according to characteristics of one or more sets of data provided to the central server from the plurality of telemetry feeds;
   providing a multicast subscription library by the central server based at least in part on the categorization of the one or more multicast sources;
   subscribing, by the processor, the client device to the multicast source based on the identified control information, wherein the multicast source is part of the provided multicast subscription library, wherein the central server blocks logging of subscribers to the multicast source;
   receiving, by the processor, the first set of data in the multicast transmission from the joined multicast source; and
   analyzing, by the processor, the first set of data from the multicast source based on one or more data analysis parameters.

2. The method of claim 1, wherein analyzing the data from the multicast source comprises at least one of:
   comparing the first set of data from the multicast source to one or more keywords; and
   detecting a pattern within a packet or across multiple packets in the multicast transmission.

3. The method of claim 2, further comprising:
   upon detecting a match between the first set of data from the multicast source and the one or more keywords, generating a notification; and
   upon detecting a pattern within a packet or across multiple packets, generating the notification.

4. The method of claim 2, further comprising:
   upon detecting a match between the first set of data from the multicast source and the one or more keywords, storing data associated with the detection; and
   upon detecting a pattern within a packet or across multiple packets, storing data associated with the detection.

5. The method of claim 1, wherein the one or more characteristics comprise at least one of a geographic location, a private sector association, a public sector association, an industry association, a corporate association, and a personal use association.

6. The method of claim 1, further comprising:
   implementing internet group management protocol (IGMP) snooping to manage processing of requests to subscribe to one or more of the one or more multicast sources and to limit information flow from the analysis functions to the multicast source.

7. The method of claim 1, wherein multicast user datagram protocol (UDP) packets are allowed in association with the multicast feed.

8. The method of claim 1, wherein no packet other than those used to select a stream of interest is permitted to flow from analysis function to multicast source.

9. The method of claim 1, wherein intra-subnet or inter-subnet communications are blocked between multiple analysis functions.

10. The method of claim 1, wherein external access to the analysis function is provided.

11. A computing device configured for multicast streaming analysis, comprising:
    a processor of a client device;
    memory in electronic communication with the processor;
    instructions stored in the memory, the instructions being executable by the processor to:
      identify control information that associates a first set of data from one or more telemetry feeds, among a plurality of telemetry feeds, with a multicast source, the plurality of telemetry feeds comprising a plurality of remote computing devices providing multiple sets of data, including the first set of data, to a central server, the central server associating the first set of data with the multicast source based at least in part on a characteristic of the first set of data, the multicast source comprising a multicast transmission of the first set of data from the central server;
      categorize one or more multicast sources according to characteristics of one or more sets of data provided to the central server from the plurality of telemetry feeds;
      provide a multicast subscription library by the central server based at least in part on the categorization of the one or more multicast sources;
      subscribe the client device to the multicast source based on the identified control information, wherein the multicast source is part of the provided multicast subscription library, wherein the central server blocks logging of subscribers to the multicast source;
      receive the first set of data in the multicast transmission from the joined multicast source; and
      analyze the first set of data from the multicast source based on one or more data analysis parameters.

12. The computing device of claim 11, wherein the instructions are executable by the processor to:
   compare the first set of data from the multicast source to one or more keywords;
   detect a pattern within a packet or across multiple packets in the multicast transmission;
   upon detecting a match between the data from the multicast source and the one or more keywords, generate a notification; and
   upon detecting a pattern within a packet or across multiple packets, generate the notification.

13. The computing device of claim 11, wherein the one or more characteristics comprise at least one of a geographic location, a private sector association, a public sector association, an industry association, a corporate association, and a personal use association.

14. The computing device of claim 11, wherein the instructions are executable by the processor to:
   implement internet group management protocol (IGMP) snooping to manage processing of requests to subscribe to one or more of the one or more multicast sources and to limit information flow from the analysis functions to the multicast source.

15. The computing device of claim 11, wherein multicast user datagram protocol (UDP) packets are allowed in association with the multicast feed.

16. A computer-program product for analyzing, by a processor of a client device, a stream of data via a multicast transmission, the computer-program product comprising a non-transitory computer-readable medium storing instructions thereon, the instructions being executable by the processor to:
   identify control information that associates a first set of data from one or more telemetry feeds, among a plurality of telemetry feeds, with a multicast source, the plurality of telemetry feeds comprising a plurality of remote computing devices providing multiple sets of data, including the first set of data, to a central server, the central server associating the first set of data with the multicast source based at least in part on a characteristic of the first set of data, the multicast source comprising a multicast transmission of the first set of data from the central server;
   categorize one or more multicast sources according to characteristics of one or more sets of data provided to the central server from the plurality of telemetry feeds;
   provide a multicast subscription library by the central server based at least in part on the categorization of the one or more multicast sources;
   subscribe the client device to the multicast source based on the identified control information, wherein the multicast source is part of the provided multicast subscription library, wherein the central server blocks logging of subscribers to the multicast source;
   receive the first set of data in the multicast transmission from the joined multicast source; and
   analyze the first set of data from the multicast source based on one or more data analysis parameters.

17. The computer-program product of claim 16, wherein the instructions are executable by the processor to:
   compare the first set of data from the multicast source to one or more keywords;
   detect a pattern within a packet or across multiple packets in the multicast transmission;
   upon detecting a match between the data from the multicast source and the one or more keywords, generate a notification; and
   upon detecting a pattern within a packet or across multiple packets, generate the notification.

* * * * *